Oct. 14, 1924.
G. R. LUSBY
SHEARS
Filed May 17, 1923
1,511,892
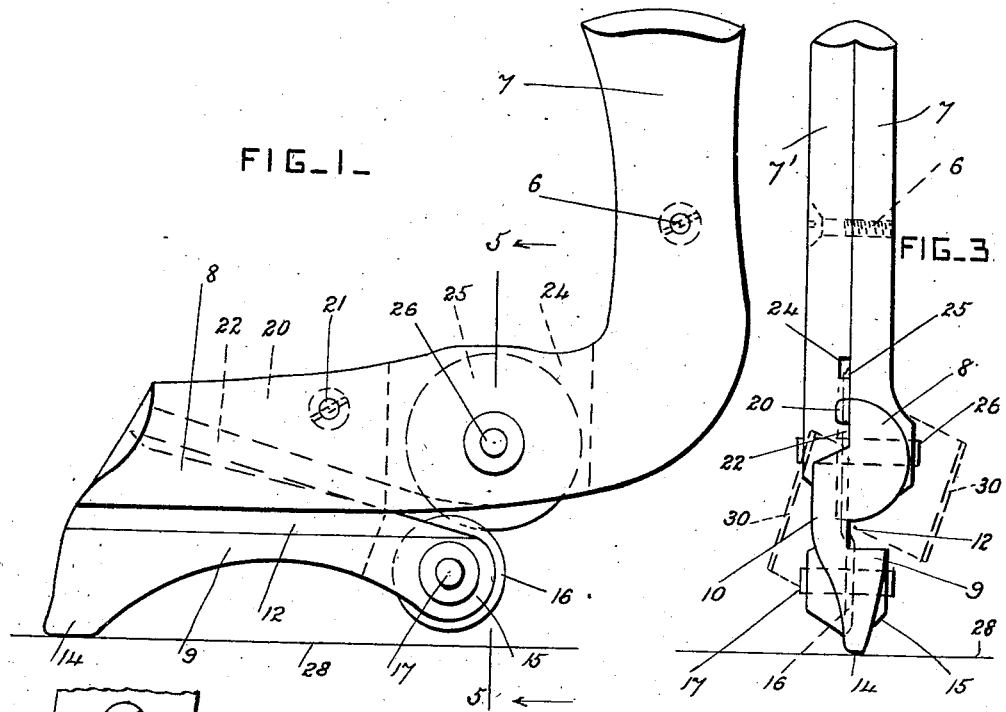
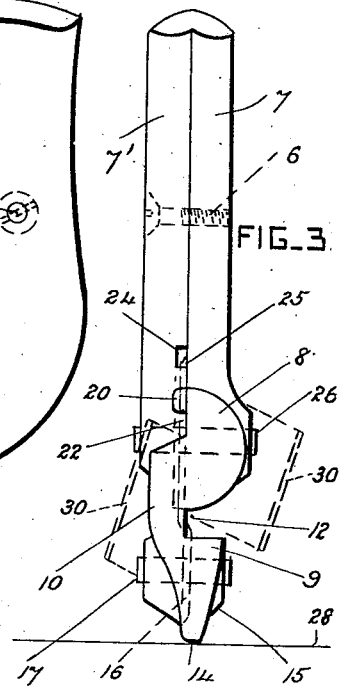
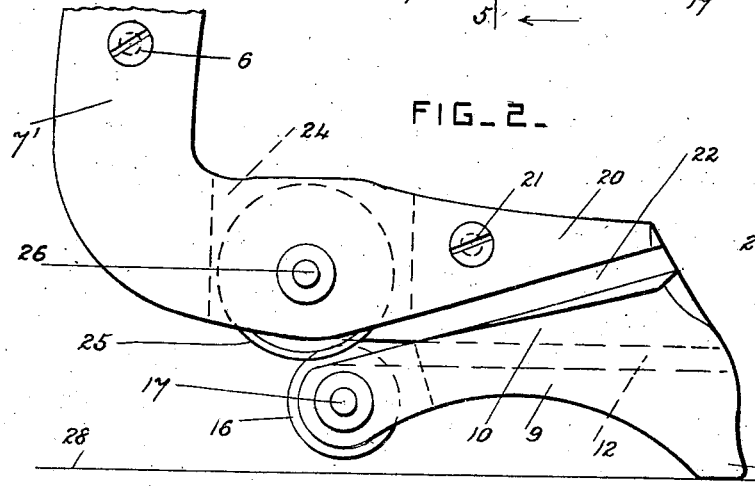
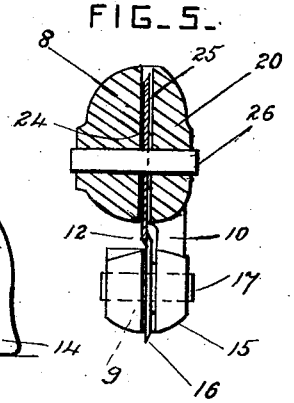
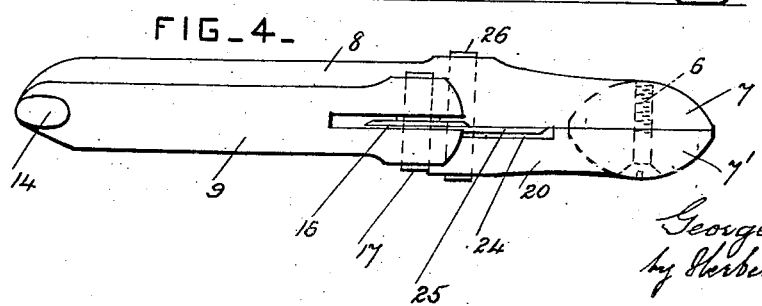
Inventor
George R. Lusby
by Herbert W. Jenner,
Attorney.

Patented Oct. 14, 1924.

1,511,892

UNITED STATES PATENT OFFICE.

GEORGE R. LUSBY, OF HESLER, KENTUCKY.

SHEARS.

Application filed May 17, 1923. Serial No. 639,537.

*To all whom it may concern:*

Be it known that I, GEORGE R. LUSBY, a citizen of the United States, residing at Hesler, in the county of Owen and State of Kentucky, have invented certain new and useful Improvements in Shears, of which the following is a specification.

This invention relates to shears provided with rotary cutting blades, specially adapted for cutting floor-cloth and other similar material into strips; and it consists in the novel construction and combination of the parts hereinafter fully described and claimed.

In the drawings, Figure 1 is a side view of a cutting implement constructed according to this invention. Fig. 2 is a side view, showing the opposite side from that shown in Fig. 1. Fig. 3 is an end view of the implement, showing a portion of the material to be cut in dotted lines. Fig. 4 is a plan view of the implement, from below. Fig. 5 is a cross-section through the implement, taken on the lines 5—5 in Fig. 1.

The frame of the implement is preferably formed of light metal, such as aluminum, and it is preferably formed in two parts arranged longitudinally side by side, and secured together by one or more screws or rivets 6 at any convenient points. The frame has a handle 7 at its front end. This handle is of any approved shape which can conveniently be grasped in one hand, and it is arranged substantially vertical when the instrument is in use. One side portion of the handle has a main cutter bar 8 at its lower end, which is arranged substantially at a right angle to the handle. An auxiliary cutter bar 9 is arranged substantially parallel to the bar 8, and is offset laterally from it, and is connected to it by an offset portion 10, so that a longitudinal groove 12 is formed between the two bars. The outer side of the main bar 8 is rounded over so that a square shoulder at the top of the groove 12 is avoided. The auxiliary bar 9 has a downwardly projecting guide lug 14 at its rear end, and a forked arm 15 at its front end. A circular cutter 16 is journaled on a pin 17 in the fork of the arm 15. Any approved guide may be used, besides the guide lug, such as an antifriction roller.

The other half 7' of the handle has an arm 20 which projects from it at an angle, and is secured against the upper half of the main cutter bar 8 by one or more screws or rivets 21. The lower edge of the arm 20 is rounded over on its outer side, and is spaced apart from the offset portion 10 of the main bar so that a longitudinal groove 22 is formed between them. The groove 22 projects upwardly and rearwardly with relation to the groove 12, and the bottom edge of the groove 12, and the bottom edge of the front end of the groove 22 is arranged substantially on a level with the top edge of the front end of the groove 12.

The front end portion of the arm 20 has a channel 24 formed vertically in its inner side, and a circular cutter 25 is journaled on a pin 26 in this channel or chamber over the cutter 16.

The cutting edges of the two cutters overlap, and are arranged opposite to the front ends of the two grooves 12 and 22.

The implement is pulled forwardly by hand with the guide lug 14 resting on any suitable support, such as a floor or table 28. The circular cutters cut through the floor-cloth or other material, a portion of which is raised above the support, and which takes the position shown by dotted lines 30 in Fig. 3. The cut material is guided, chiefly by the lower edge of the groove 12, so that the cut parts are twisted with relation to each other and are separated so as to permit the implement to slide freely between them.

What I claim is:

1. A shears, comprising a cutter bar and its handle formed of two parts arranged side by side, one part of the cutter bar having a main bar and an auxiliary bar connected together by an offset portion and forming a guide groove, said auxiliary bar being provided with a floor guide at its rear end and a forked arm at its front end, said part having also one half of the handle at its front end, one of the said parts of the cutter bar having a channel formed in its inner side face above the said forked arm, and the other part of the cutter bar having the other half of the handle at its front end and having its rear end portion spaced apart from the said auxiliary bar to form a second guide groove, and rotary cutters mounted in the said forked arm and channel.

2. A shears, comprising a cutter bar and its handle formed of two parts secured side by side, one part of the cutter bar having a main bar and an auxiliary bar connected together by an offset portion and forming a guide groove, said auxiliary bar being provided with a floor guide at its rear end and a forked arm at its front end, said part having also one half of the handle at its front end, and the other part of the cutter bar having the other half of the handle at its front end, a channel in its inner side face above the said forked arm, and having its rear end portion spaced apart from the said auxiliary bar to form a second guide groove, and rotary cutters mounted in the said forked arm and channel, the two guide grooves being arranged at an angle to each other, and the handle being arranged at substantially a right angle to the cutter bar.

In testimony whereof I have affixed my signature.

GEORGE R. LUSBY.